United States Patent
Hao et al.

(10) Patent No.: US 11,152,876 B2
(45) Date of Patent: Oct. 19, 2021

(54) APPARATUS AND METHOD FOR POSITION SENSING OF INTEGRATED BRUSHLESS STARTER

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 16/597,098

(22) Filed: Oct. 9, 2019

(65) Prior Publication Data

US 2021/0111648 A1    Apr. 15, 2021

(51) Int. Cl.
*H02P 6/16* (2016.01)
*F02N 11/14* (2006.01)

(52) U.S. Cl.
CPC ............... *H02P 6/16* (2013.01); *F02N 11/14* (2013.01)

(58) Field of Classification Search
CPC ......... H02P 21/32; H02P 2203/03; H02P 6/16
See application file for complete search history.

(56) References Cited

U.S. PATENT DOCUMENTS

| | | | |
|---|---|---|---|
| 9,059,649 B1* | 6/2015 | Droz ........................ | H02P 6/16 |
| 10,036,359 B2 | 7/2018 | Hao et al. | |
| 10,184,442 B2 | 1/2019 | Hao et al. | |
| 10,190,559 B2 | 1/2019 | Hao et al. | |
| 10,293,804 B2 | 5/2019 | Namuduri et al. | |
| 10,330,070 B2 | 6/2019 | Hao et al. | |
| 2003/0034748 A1* | 2/2003 | Walters ..................... | H02P 6/20 318/400.11 |
| 2014/0167662 A1* | 6/2014 | Ajima ..................... | H02P 21/18 318/400.04 |
| 2015/0303845 A1* | 10/2015 | Suda ........................ | H02P 6/16 318/400.38 |
| 2017/0338706 A1 | 11/2017 | Hao et al. | |
| 2018/0205330 A1* | 7/2018 | Tokairin .................... | H02P 6/20 |
| 2018/0258900 A1 | 9/2018 | Namuduri et al. | |

(Continued)

FOREIGN PATENT DOCUMENTS

DE    112012003134 T5    4/2014

OTHER PUBLICATIONS

Office Action dated Nov. 5, 2020 from German Patent Offie for German Patent Application No. 12020125008.8; 5 Pages.

(Continued)

*Primary Examiner* — Bickey Dhakal
(74) *Attorney, Agent, or Firm* — Harness, Dickey & Pierce, P.L.C.

(57) ABSTRACT

A system includes a position sensor configured to detect positions of a rotor of a starter motor relative to the position sensor and to output signals indicating the detected positions and a controller configured to rotate the rotor to a plurality of predetermined positions relative to a stator of the starter motor, determine sensed positions of the rotor based on the signals output by the position sensor, and calculate an initial detected position of the rotor based on relationships between the determined sensed positions of the rotor and an expected angular distance between adjacent ones of the predetermined positions.

16 Claims, 7 Drawing Sheets

(56) References Cited

U.S. PATENT DOCUMENTS

2020/0036313 A1* 1/2020 Nam .................. H02P 21/18

OTHER PUBLICATIONS

U.S. Appl. No. 15/961,094, filed Apr. 24, 2018, Hao et al.
U.S. Appl. No. 15/961,119, filed Apr. 24, 2018, Omekanda et al.
U.S. Appl. No. 15/961,128, filed Apr. 24, 2018, Hao et al.
U.S. Appl. No. 15/961,176, filed Apr. 24, 2018, Hao et al.
U.S. Appl. No. 15/961,198, filed Apr. 24, 2018, Namuduri et al.
U.S. Appl. No. 15/961,204, filed Apr. 24, 2018, Namuduri et al.
U.S. Appl. No. 15/961,216, filed Apr. 24, 2018, Namuduri et al.
U.S. Appl. No. 15/967,904, filed May 1, 2018, Gopalakrishnan et al.
U.S. Appl. No. 15/967,910, filed May 1, 2018, Hao et al.
U.S. Appl. No. 15/967,915, filed May 1, 2018, Namuduri et al.
U.S. Appl. No. 15/967,918, filed May 1, 2018, Namuduri et al.
U.S. Appl. No. 15/967,961, filed May 1, 2018, Gopalakrishnan et al.
U.S. Appl. No. 16/520,905, filed Jul. 24, 2019, Hao et al.
"Open Parking Space Identifier". Research Disclosure Database No. 642087. Disclosed anonymously. www.researchdisclosure.com. Published in the Oct. 2017 Paper Journal; Published digitally Sep. 13, 2017 19:15 UT; 3 pages.

* cited by examiner

APPARATUS AND METHOD FOR POSITION SENSING OF INTEGRATED BRUSHLESS STARTER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Vehicles typically include an internal combustion engine that combusts an air/fuel mixture within cylinders to produce drive torque. In some examples, a vehicle may be a hybrid vehicle including an electric motor configured to provide additional drive torque. Non-hybrid and hybrid vehicles may include a starter motor configured to facilitate cranking and starting of the engine. For example, the starter motor may include a brushless starter.

SUMMARY

A system includes a position sensor configured to detect positions of a rotor of a starter motor relative to the position sensor and to output signals indicating the detected positions and a controller configured to rotate the rotor to a plurality of predetermined positions relative to a stator of the starter motor, determine sensed positions of the rotor based on the signals output by the position sensor, and calculate an initial detected position of the rotor based on relationships between the determined sensed positions of the rotor and an expected angular distance between adjacent ones of the predetermined positions.

In other features, the predetermined positions correspond to axes of the stator.

In other features, the stator is a three phase stator and the controller is configured to align the rotor to a first axis, a second axis, and a third axis of the stator and calculate the initial detected position based on respective sensed positions of the rotor when aligned with the first axis, the second axis, and the third axis.

In other features, the stator is an n phase stator, wherein n is an integer greater than three, and the controller is configured to align the rotor to n axes of the stator and calculate the initial detected position based on respective sensed positions of the rotor when aligned with the N axes.

In other features, the controller is configured to rotate the rotor to a first position, determine a first sensed position, rotate the rotor to a second position, determine a second sensed position, and calculate the initial detected position based on a difference between the first sensed position and the second sensed position.

In other features, if the difference between the first sensed position and the second sensed position is approximately equal to the expected angular distance between adjacent axes of the stator, the controller sets the first sensed position as the initial detected position.

In other features, the controller is configured to rotate the rotor to a third position, determine a third sensed position, and calculate the initial detected position based on a difference between the second sensed position and the third sensed position.

In other features, if the difference between the second sensed position and the third sensed position is approximately equal to the expected angular distance between adjacent axes of the stator, the controller sets a difference between the second sensed position and the expected angular distance as the initial detected position.

In other features, the controller is configured to rotate the rotor to the first position, determine a fourth sensed position, and calculate the initial detected position based on a difference between the third sensed position and the fourth sensed position.

In other features, if the difference between the second sensed position and the third sensed position is approximately equal to the expected angular distance between adjacent axes of the stator, the controller sets a difference between the second sensed position and the expected angular distance as the initial detected position.

In other features, the expected angular distance is approximately $360/n$, and wherein n is an integer corresponding to a number of phases of the stator.

In other features, the expected angular distance is approximately 60 degrees.

A method includes detecting positions of a rotor of a starter motor relative to a position sensor, outputting signals indicating the detected positions, rotating the rotor to a plurality of predetermined positions relative to a stator of the starter motor, determining sensed positions of the rotor based on the signals output by the position sensor, calculating an initial detected position of the rotor based on relationships between the determined sensed positions of the rotor and an expected angular distance between adjacent ones of the predetermined positions, and controlling the rotor based on the calculated initial detected position.

In other features, the predetermined positions correspond to axes of the stator.

In other features, the stator is an n-phase stator and n is an integer greater than or equal to three and further comprising aligning the rotor to n axes of the stator and calculating the initial detected position based on respective sensed positions of the rotor when aligned with n axes.

In other features, the method includes rotating the rotor to a first position, determining a first sensed position, rotating the rotor to a second position, determining a second sensed position, and calculating the initial detected position based on a difference between the first sensed position and the second sensed position.

In other features, the method includes, if the difference between the first sensed position and the second sensed position is approximately equal to the expected angular distance between adjacent axes of the stator, setting the first sensed position as the initial detected position.

In other features, the method includes rotating the rotor to a third position, determining a third sensed position, and calculating the initial detected position based on a difference between the second sensed position and the third sensed position.

In other features, the method includes, if the difference between the second sensed position and the third sensed position is approximately equal to the expected angular distance between adjacent axes of the stator, setting a difference between the second sensed position and the expected angular distance as the initial detected position.

In other features, the method includes rotating the rotor to the first position, determining a fourth sensed position, and calculating the initial detected position based on a difference between the third sensed position and the fourth sensed position.

In other features, the method includes, if the difference between the second sensed position and the third sensed position is approximately equal to the expected angular distance between adjacent axes of the stator, setting a difference between the second sensed position and the expected angular distance as the initial detected position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Torque and speed of a brushless starter may be controlled based on a position signal indicating a position of the starter (e.g., a rotational position of a rotor of the starter). The brushless starter may include a position sensor to detect positions (including an initial position) and generate the position signal accordingly. In some examples, the position sensor may correspond to an integrated position sensor to minimize packaging space. Systems and methods according to the principles of the present disclosure provide improved detection of the initial position of the brushless starter.

Figure 1:
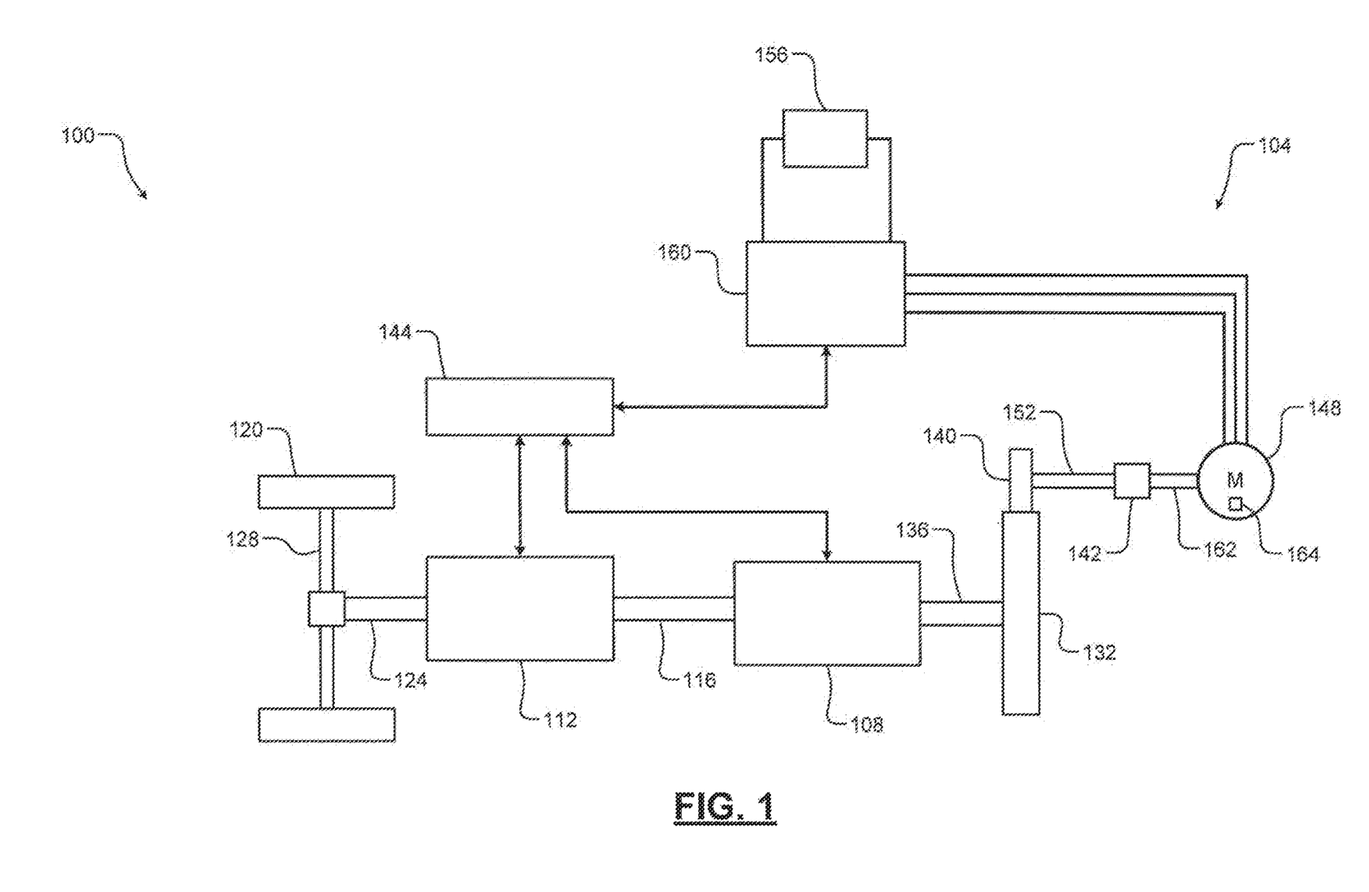
FIG. 1 is a block diagram of an example vehicle including an electric starter system according to the principles of the present disclosure.

Referring now to FIG. 1, an example vehicle 100 including an electric starter system 104 according to the principles of the present disclosure is shown. The electric starter system 104 is selectively connected to an engine (e.g., an internal combustion engine) 108 configured to output engine torque to a transmission 112 via an output shaft 116. The transmission 112 provides output torque to wheels 120 via a driveshaft 124 and respective drive axles 128.

The engine 108 is connected to a flywheel 132 via a crankshaft 136. The electric starter system 104 may be selectively connected to the engine 108 via a pinion gear 140 and the flywheel 132. For example, a solenoid 142 or other actuator may be energized (e.g., responsive to signals from a controller 144) to cause the pinion gear 140 to engage the flywheel 132. In this manner, additional torque can be provided by a starter motor 148 via a motor shaft 152.

The electric starter system 104 may receive power from a battery pack 156, which may correspond to and/or include a multi-cell lithium ion, nickel metal hydride, lead acid, or other suitable type of battery pack. A motor drive system (e.g., a power inverter module) 160 is connected across positive and negative terminals of the battery pack 156 to convert a DC voltage provided by the battery pack 156 to a polyphaser or AC voltage suitable for controlling the starter motor 148. For example, the motor drive system 160 includes switch pairs arranged to selectively provide power to individual phase windings of the starter motor 148 as described below in more detail.

Torque control of the starter motor 148 is dependent upon accurately determining a position of a rotor 162 of the starter motor 148. More specifically, an initial position of the rotor 162 of the starter motor 148 is needed to achieve maximum power/torque and control of the starter motor 148. For example, the starter motor 148 includes a position sensor 164 arranged to sense an angular position of the rotor 162 of the starter motor 148. The position sensor 164 is a rotary angular sensor configured to sense an angular position of the rotor 162 relative to the position sensor 164. For example only, the sensed angular position of the rotor 162 may correspond to an absolute position. The position sensor 164 may be configured to output a position signal or a signal that can be used to calculate (e.g., by the controller 144) a sensed position. The controller 144 according to the principles of the present disclosure is configured to determine an initial position of the starter motor 148 (i.e., the rotor 162) as described below in more detail.

Figure 2A:
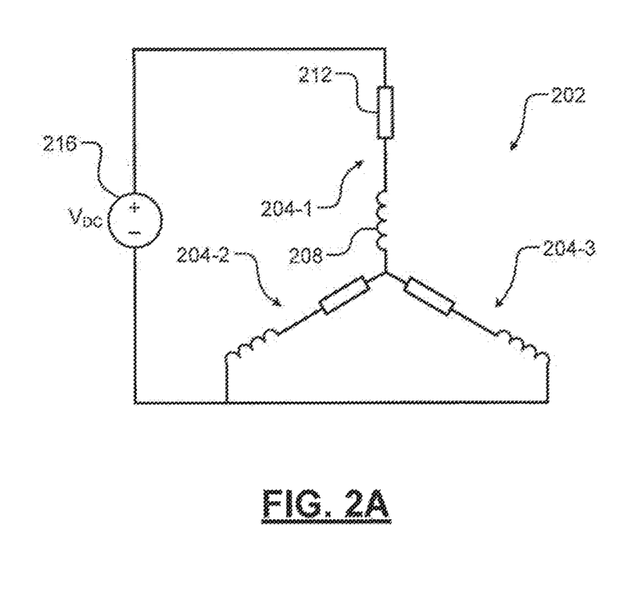
FIGS. 2A, 2B, 2C, 2D, 2E, and 2F illustrate example control and initial position detection of a motor according to the principles of the present disclosure.
Figure 2B:
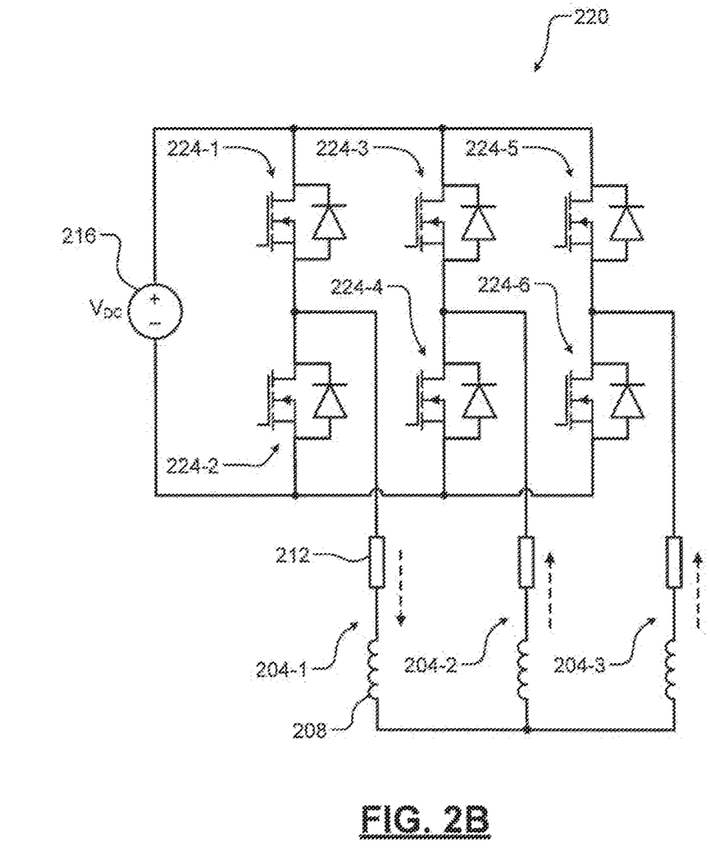
Figure 2C:
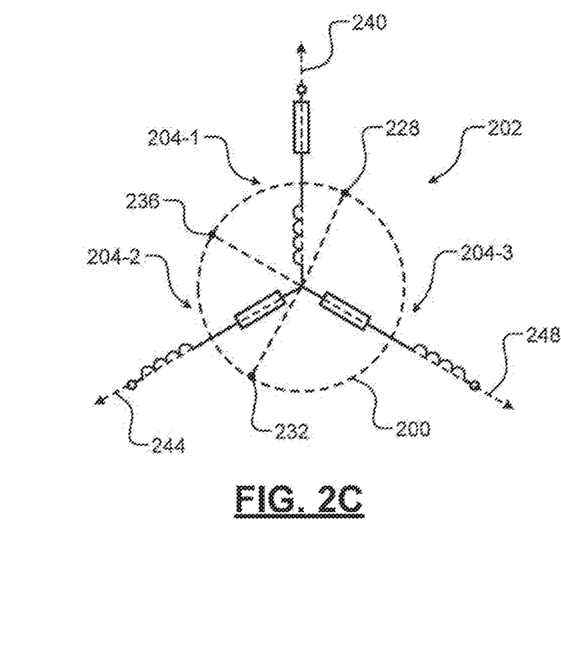
Figure 2D:
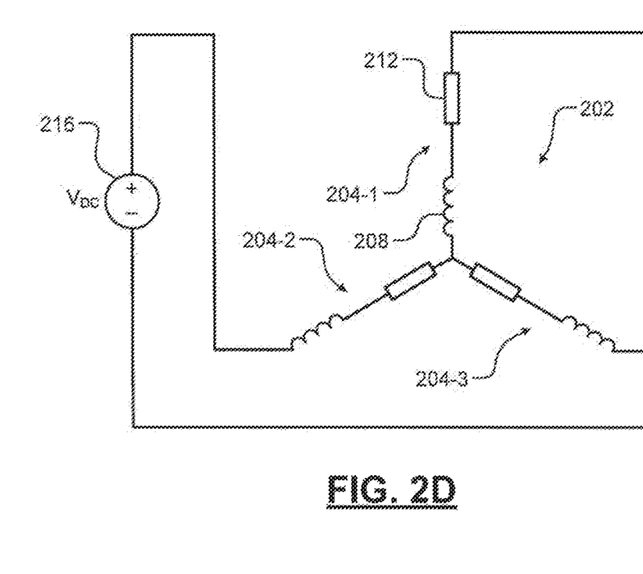

Referring now to FIGS. 2A through 2F and with continued reference to FIG. 1, example control and initial position detection of a motor (e.g., the starter motor 148) is described. The motor (e.g., a rotor 200 of the motor as shown in FIG. 2C) is rotated by energizing a stator 202. For example, the stator 202 includes individual phase coils 204-1, 204-2, and 204-3, referred to collectively as coils 204, each having a respective inductance 208 and resistance 212. As shown, the stator 202 has three of the coils 204 wrapped around respective stator teeth (not shown). Accordingly, here the stator 202 corresponds to a three phase motor.

The rotor 200 is rotated by selectively connecting the coils 204 to a voltage 216 (e.g., a DC voltage supplied by the battery pack 156). For example, a drive system 220 (e.g., corresponding to the motor drive system 160) includes respective pairs of switches 224-1, 224-2, 224-3, 224-4, 224-5, and 224-6, referred to collectively as switches 224. For example only, the switches 224 may correspond to transistors, transistor diode pairs (as shown), etc. A controller (e.g., the controller 144) turns on (i.e., closes) and off (i.e., opens) selected ones of the switches 224 to energize one or more of the coils 204 to rotate the motor. For example, only one of the coils 204 may be energized at a time or two or more of the coils 204 may be energized simultaneously.

Prior to starting the motor, one or more of the coils 204 may be energized to adjust an alignment of the rotor 200 relative to the stator 202 (i.e., to adjust the rotor 200 to an initial, known position). For example, the stator 202 (i.e., a magnetic field of the stator 202) may have multiple axes, such as an A-axis, a B-axis, and a C-axis for a three phase stator. The rotor 200 may be adjusted to align the rotor 200 (i.e., a magnetic field of the rotor 200) with a selected one of the stator axes. In some examples, the switches 224-1, 224-4, and 224-6 are turned on to align the rotor 200 with a nearest axis of the stator 202 by causing current to flow through the coils 204 in respective directions of the dashed arrows shown in FIG. 2B.

Typically, selected ones (e.g., at least two) of the coils 204 are energized to cause the rotor 200 to align with a desired position, the rotor 200 will rotate in a direction, either clockwise or counterclockwise, corresponding to a shortest distance to the nearest axis of the stator 202. However, brushless starters may include a one-way clutch that only allows rotational movement of the rotor 200 in one direction (e.g., counterclockwise). Accordingly, if the direction corresponding to the shortest distance to the alignment position is opposite the direction allowed by the one-way clutch, rotation (and, therefore, alignment) of the rotor 200 is prevented.

FIG. 2C shows the stator 202 and possible rotor locations 228, 232, and 236 (which indicate respective orientations of an axis of the rotor 200). The controller 144 is configured to selectively turn on combinations of the switches 224 to rotate and determine an initial position of the rotor 200 relative to an A-axis 240, a B-axis 244, and a C-axis 248 of the stator 202.

For example, the switches 224-1, 224-4, and 224-6 are turned on in a first alignment period to connect the coils 204 in the manner shown in FIG. 2A. If the rotor 200 is in the location 228, turning on the switches 224-1, 224-4, and 224-6 will align the rotor 200 with the A-axis 240 of the stator 202. Conversely, if the rotor 200 is in the location 232 or 236, the one-way clutch would prevent the rotor 200 from rotating to align with the A-axis 240. The controller 144 determines the position of the rotor 200 (e.g., based on a signal received from the sensor 164) with the switches 224-1, 224-4, and 224-6 turned on. For example, the controller 144 determines an angular position (i.e., an offset angle) of the rotor 200 relative to the position sensor 164. The sensed position of the rotor 200 may be stored as a first sensed angle A1 subsequent to (e.g., 100 ms after) turning on the switches 224-1, 224-4, and 224-6. The first sensed angle A1 of the rotor 200 may be used to determine whether the rotor 200 rotated to align with the A-axis 240 in response to turning on the switches 224-1, 224-4, and 224-6 as described below in more detail.

As described above, if the rotor 200 is initially in the location 232 or 236, turning on the switches 224-1, 224-4, and 224-6 does not move the rotor 200 since the one-way clutch prevents the rotor from rotating clockwise to align with the A-axis 240. Accordingly, the first alignment period may not be sufficient to determine an initial position of the rotor 200. In a second alignment period, the switches 224-2, 224-3, and 224-6 are turned on to connect the coils 204 in the manner shown in FIG. 2D. If the rotor 200 is in the location 236, turning on the switches 224-2, 224-3, and 224-6 will align the rotor 200 with the B-axis 244 of the stator 202. Conversely, if the rotor 200 is in the location 232, the one-way clutch would prevent the rotor 200 from rotating to align with the B-axis 244. The controller 144 determines the position of the rotor 200 with the switches 224-2, 224-3, and 224-6 turned on and stores this sensed position as a second sensed angle B1 (e.g., a predetermined period, such as 100 ms, subsequent to turning on the switches 224-2, 224-3, and 224-6).

The controller 144 determines a difference between the sensed angles A1 and B1 to determine whether additional alignment periods are required. For example, if the difference between A1 and B1 is approximately 120 degrees (i.e., the angular difference between the A-axis 240 and the B-axis 244), then it can be assumed that the rotor 200 was aligned with the A-axis 240 in the first alignment period and aligned with the B-axis 244 in the second alignment period. In other words, the rotor 200 travelled 120 degrees in the second alignment period. Accordingly, the controller 144 sets the initial position of the rotor as the sensed angle A1. Conversely, if the difference between A1 and B1 is not approximately (e.g., within 5 degrees of) 120 degrees, additional alignment periods may be performed.

Figure 2E:
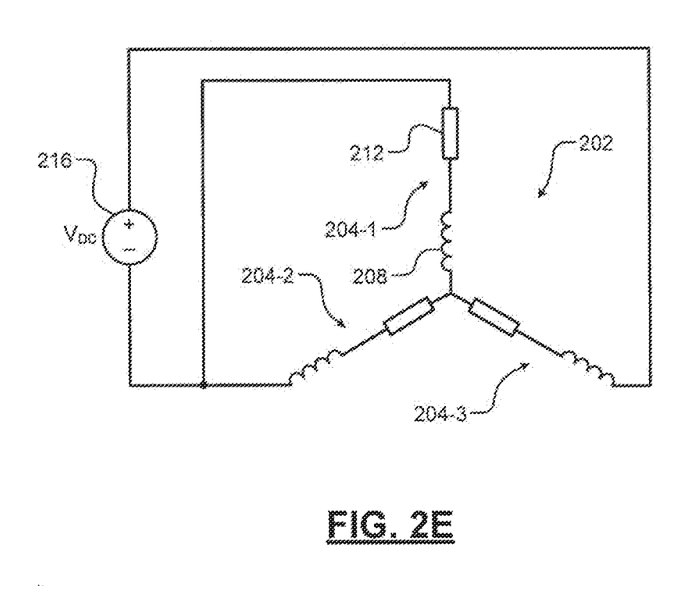

In a third alignment period, the switches 224-2, 224-4, and 224-5 are turned on to connect the coils 204 in the manner shown in FIG. 2E. If the rotor 200 is in the location 232, turning on the switches 224-2, 224-4, and 224-5 will align the rotor 200 with the C-axis 248 of the stator 202. The controller 144 determines the position of the rotor 200 with the switches 224-2, 224-4, and 224-5 turned on and stores this sensed position as a third sensed angle C1.

The controller 144 determines a difference between the sensed angles B1 and C1 to determine whether additional alignment periods are required. For example, if the difference between B1 and C1 is approximately 120 degrees (i.e., the angular difference between the B-axis 244 and the C-axis 248), then it can be assumed that the rotor 200 was aligned with the B-axis 240 in the second alignment period and aligned with the C-axis 248 in the third alignment period. In other words, the rotor 200 travelled 120 degrees in the third alignment period. Accordingly, the controller 144 sets the initial position of the rotor 200 as a difference between the second sensed angle B1 and 120 degrees. Conversely, if the difference between B1 and C1 is not approximately (e.g., within 5 degrees of) 120 degrees, additional alignment periods may be performed.

Figure 2F:
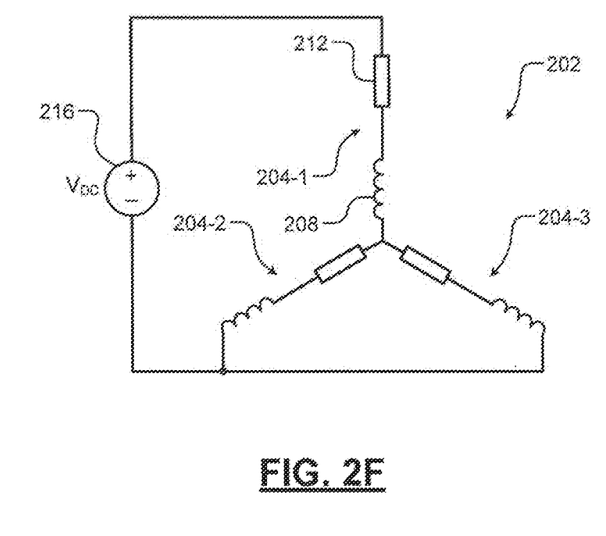

In a fourth alignment period, the switches 224-1, 224-4, and 224-6 are turned on to connect the coils 204 in the manner shown in FIG. 2F (which is analogous to the connection of the coils 204 shown in FIG. 2A. Assuming that the rotor 200 was aligned with the C-axis 248 in the third alignment period, turning on the switches 224-1, 224-4, and 224-6 will align the rotor 200 with the A-axis 240 of the stator 202. The controller 144 determines the position of the rotor 200 with the switches 224-1, 224-2, and 224-6 turned on and stores this sensed position as a fourth sensed angle A2.

The controller 144 determines a difference between the sensed angles C1 and A2 to determine whether to set the initial position of the rotor 200 as A2. For example, if the difference between C1 and A2 is approximately 120 degrees (i.e., the angular difference between the C-axis 248 and the A-axis 240), then it can be assumed that the rotor 200 was aligned with the C-axis 248 in the third alignment period and aligned with the A-axis 240 in the fourth alignment period. In other words, the rotor 200 travelled 120 degrees in the fourth alignment period. Accordingly, the controller 144 sets the initial position of the rotor 200 as the fourth sensed angle A2. Conversely, if the difference between C1 and A2 is not approximately (e.g., within 5 degrees of) 120 degrees, the controller 144 may determine that there is a fault with the sensor 164.

In this manner as described above in FIGS. 2A-2F, the controller 144 according to the principles of the present disclosure is configured to sequentially align the rotor 200 with each of the A-axis 240, the B-axis 244, and the C-axis 248 of the stator 202 in respective alignment periods. The controller 144 determines the position of the rotor 200 (e.g., based on signals received from the sensor 164) in each of the alignment periods to determine whether the rotor 200 rotated in response to energizing the appropriate coils 204.

Figure 3:
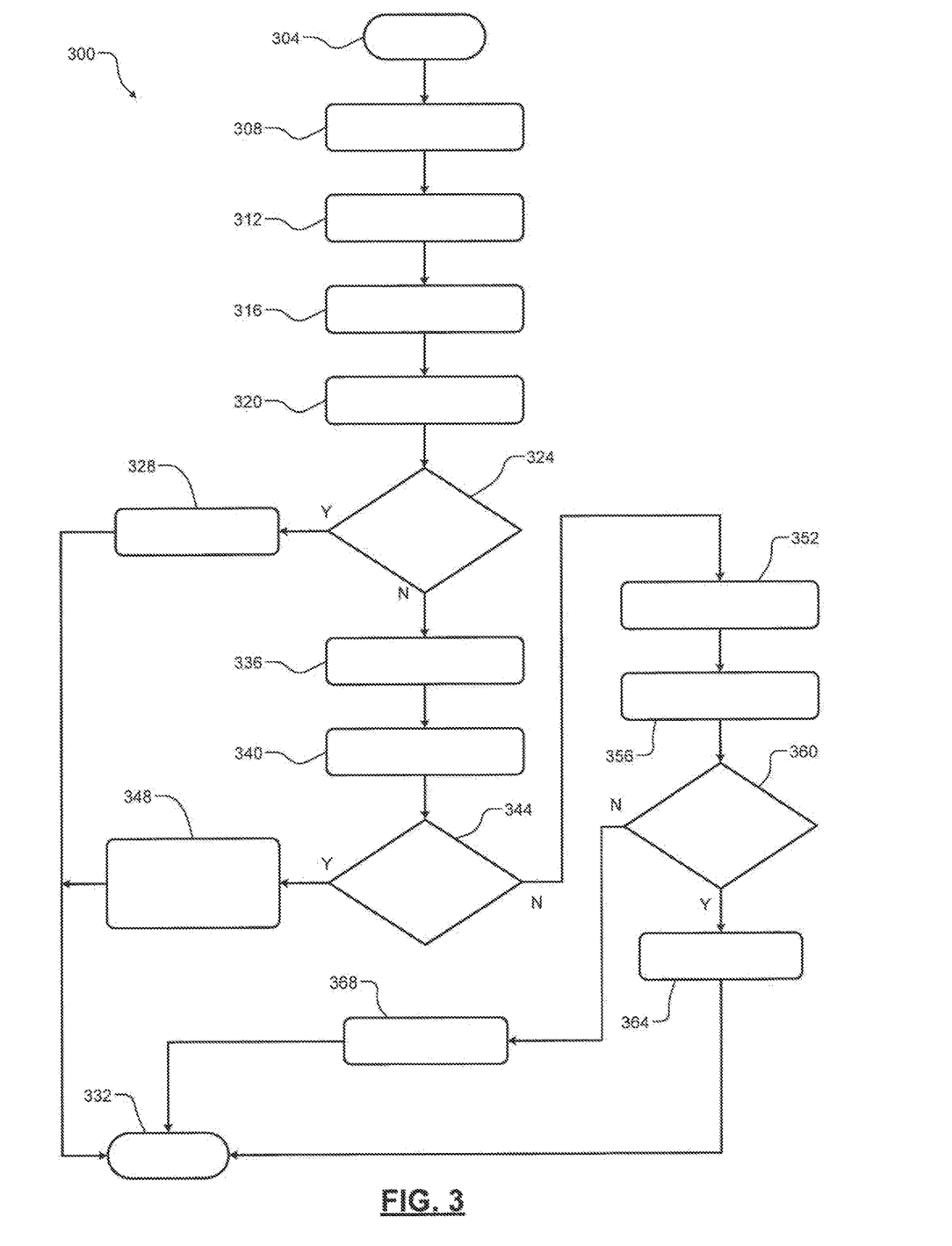
FIG. 3 illustrates steps of an example method for detecting an initial position of a motor according to the principles of the present disclosure.

Referring now to FIG. 3, an example method 300 for detecting an initial position of a motor according to the principles of the present disclosure begins at 304. At 308, the method 300 energizes coils of a stator to align a rotor with a first axis (e.g., an A-axis) of the stator and waits a predetermined period (e.g., 100 ms) to allow the rotor to rotate. At 312, the method 300 determines a first sensed (e.g., angular) position of the rotor. At 316, the method 300 energizes coils of the stator to align the rotor with a second axis (e.g., a B-axis) of the stator and waits the predetermined period. At 320, the method 300 determines a second sensed position of the rotor. At 324, the method 300 determines whether a difference between the first and second sensed positions corresponds (e.g., is approximately equal) to an angular distance (e.g., 120 degrees for a three phase stator) between the first axis and the second axis. If true, the method 300 sets the first sensed position as the detected initial position of the motor at 328 and ends at 332. If false, the method 300 continues to 336.

At 336, the method 300 energizes coils of the stator to align the rotor with a third axis (e.g., a C-axis) of the stator and waits the predetermined period. At 340, the method 300 determines a third sensed position of the rotor. At 344, the method 300 determines whether a difference between the second and third sensed positions corresponds to an angular distance between the second axis and the third axis. If true, the method 300 sets a difference between the second sensed position and the angular distance between the second axis and the third axis (e.g., 120 degrees) as the detected initial position of the motor at 348 and ends at 332. If false, the method 300 continues to 352.

At 352, the method 300 energizes coils of the stator to align the rotor with the first axis (e.g., the A-axis) of the stator and waits the predetermined period. At 356, the method 300 determines a fourth sensed position of the rotor. At 360, the method 300 determines whether a difference between the third and fourth sensed positions corresponds to an angular distance between the third axis and the first axis. If true, the method 300 sets the fourth sensed position as the detected initial position of the motor at 364 and ends at 332. If false, the method 300 continues to 368. At 368, the method 300 indicates a position sensor fault and ends at 332.

Figure 4A:
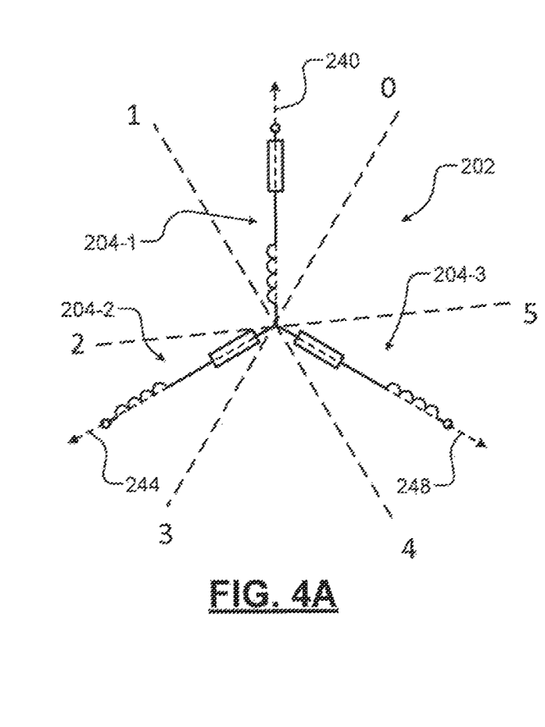
FIGS. 4A and 4B illustrate another example control and initial position detection of a motor according to the principles of the present disclosure.
Figure 4B:
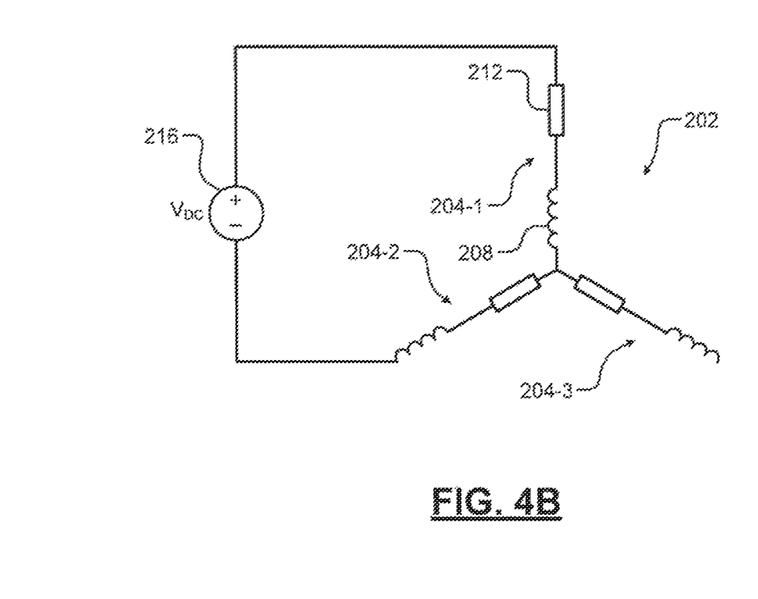

In other examples, the switches 224 can be controlled to energize only two of the coils 204 at any given time to align the rotor 200 to six different positions. For example, as shown in FIGS. 4A and 4B and with continued reference to FIGS. 2B and 2C, the switches 224 are controlled to selectively energize the coils 204 to sequentially align the rotor 200 with respective positions 0-5. For example only, the switches 224-1 and 224-4 are turned on to connect the coils 204-1 and 204-2 in the manner shown in FIG. 4B to align the rotor 200 with the position 0 in a first alignment period and a first sensed angle 0 is determined. The switches 224 are controlled in a similar manner in subsequent alignment periods to sequentially attempt to rotate the rotor 200 to the positions 1-5 and respective sensed angles 1-5 are determined. Unlike the example described in FIGS. 2A-2F, in this example the expected difference between the sensed angles in the respective positions is 60 degrees. Accordingly, an initial position can be detected based on a determination of whether the rotor 200 travelled approximately 60 degrees in sequential alignment periods.

In some example, the controller 144 may be further configured to detection a position sensor fault. Generally, position sensor faults may be related to discontinuous signal faults (e.g., caused by noise) or continuous signal faults (e.g., caused by a faulty position sensor). A discontinuous signal fault may not prevent an electric starting system from starting a vehicle engine. Conversely, a continuous signal fault may cause stalling conditions. The controller 144 according to the present disclosure is configured to determine whether stalling conditions are caused by a faulty position sensor. For example, in normal operating conditions, the starter motor will reach a predetermined speed (e.g., 6000 rpm) within a predetermined period (e.g., 30 ms). The controller 144 is configured to determine whether the motor reaches the predetermined speed within the predetermined time.

Figure 5:
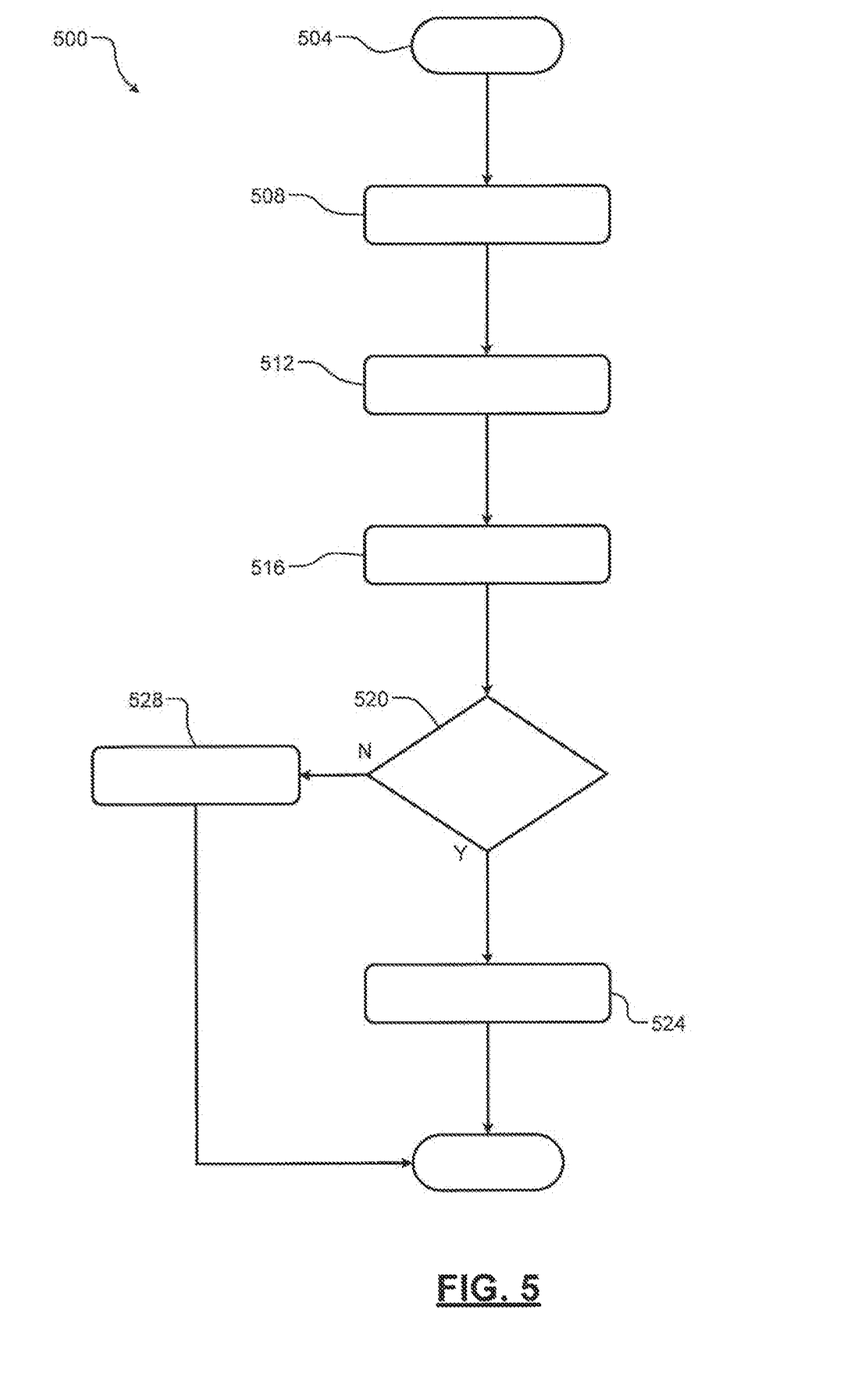
FIG. 5 illustrates steps of an example method for detecting a position sensor fault according to the principles of the present disclosure.

Referring now to FIG. 5, an example method 500 for detecting a position sensor fault (e.g., as implemented by the controller 144) according to the present disclosure begins at 504. At 508, a starter motor receives a signal to start. For example, the controller 144 outputs a signal to the motor drive system 160 to start the starter motor 148. At 512, the method 500 waits a predetermined period. For example, the method 500 waits a predetermined period that is greater than a typical time need for the starter motor to reach a predetermined speed. For example only, the predetermine period may be 50 ms. At 516, the method 500 (e.g., the controller 144) determines a speed of the starter motor. At 520, the method 500 (e.g., the controller 144) determines whether the determined speed is greater than the predetermined speed (e.g., 6000 rpm). If true, the method 500 continues to 524. If false, the method 500 continues to 528.

At 524, the method 500 (e.g., the controller 144) determines that the position sensor is not faulty and operates the starter motor in a normal operating mode. At 528, the method 500 (e.g., the controller 144) determines the position sensor is faulty and operates the starter motor in a fault mode. The method 500 ends at 532.

While the above description relates to brushless starters for vehicles, the principles of the present application may also be applied to non-vehicle implementations of brushless motors. Further, while the above description relates to brushless starters with three phase motors, the principles of the present disclosure may also be applied to multi-phase (e.g., greater than three phase) brushless starters.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a position sensor configured to detect positions of a rotor of a starter motor relative to the position sensor and to output signals indicating the detected positions; and
a controller configured to
rotate the rotor to a plurality of predetermined positions relative to a stator of the starter motor, wherein the predetermined positions include a first position and a second position corresponding to respective axes of the stator and rotating the rotor includes rotating the rotor to the first position and the second position,
determine sensed positions of the rotor based on the signals output by the position sensor by determining a first sensed position at the first position and determining a second sensed position at the second position, and
calculate an initial detected position of the rotor based on a comparison between (i) a difference between the first sensed position and the second sensed position and (ii) an expected angular distance between adjacent axes of the stator.

2. The system of claim 1, wherein one of:
(i) the stator is a three phase stator and the controller is configured to align the rotor to a first axis, a second axis, and a third axis of the stator corresponding to the first position, the second position, and a third position, respectively and calculate the initial detected position based on respective sensed positions of the rotor when aligned with the first axis, the second axis, and the third axis; and (ii) the stator is an n phase stator, wherein n is an integer greater than three, and the controller is configured to align the rotor to n axes of the stator and calculate the initial detected position based on respective sensed positions of the rotor when aligned with the N axes.

3. The system of claim 1, wherein, if the difference between the first sensed position and the second sensed position is approximately equal to the expected angular distance between the adjacent axes of the stator, the controller sets the first sensed position as the initial detected position.

4. The system of claim 1, wherein the controller is configured to, subsequent to rotating the rotor to the first position and the second position, rotate the rotor to a third position, determine a third sensed position, and calculate the initial detected position further based on a difference between the second sensed position and the third sensed position.

5. The system of claim 4, wherein, if the difference between the second sensed position and the third sensed position is approximately equal to the expected angular distance between the adjacent axes of the stator, the controller sets a difference between the second sensed position and the expected angular distance as the initial detected position.

6. The system of claim 4, wherein the controller is configured to again rotate the rotor to the first position, determine a fourth sensed position, and calculate the initial detected position further based on a difference between the third sensed position and the fourth sensed position.

7. The system of claim 6, wherein, if the difference between the second sensed position and the third sensed position is approximately equal to the expected angular distance between the adjacent axes of the stator, the controller sets a difference between the second sensed position and the expected angular distance as the initial detected position.

8. The system of claim 1, wherein the expected angular distance is approximately 360/n, and wherein n is an integer corresponding to a number of phases of the stator.

9. The system of claim 1, wherein the expected angular distance is approximately 60 degrees.

10. A method, comprising:
detecting positions of a rotor of a starter motor relative to a position sensor;
outputting signals indicating the detected positions;
rotating the rotor to a plurality of predetermined positions relative to a stator of the starter motor, wherein the predetermined positions include a first position and a second position corresponding to respective axes of the stator and rotating the rotor includes rotating the rotor to the first position and the second position;
determining sensed positions of the rotor based on the signals output by the position sensor, wherein determining the sensed positions includes determining a first sensed position at the first position and determining a second sensed position at the second position;
calculating an initial detected position of the rotor based on a comparison between (i) a difference between the first sensed position and the second sensed position and (ii) an expected angular distance between adjacent axes of the stator; and
controlling the rotor based on the calculated initial detected position.

11. The method of claim 10, wherein the stator is an n-phase stator and n is an integer greater than or equal to three and further comprising aligning the rotor to n axes of the stator and calculating the initial detected position further based on respective sensed positions of the rotor when aligned with n axes.

12. The method of claim 10, further comprising, if the difference between the first sensed position and the second sensed position is approximately equal to the expected angular distance between the adjacent axes of the stator, setting the first sensed position as the initial detected position.

13. The method of claim 10, further comprising, subsequent to rotating the rotor to the first position and the second position, rotating the rotor to a third position, determining a third sensed position, and calculating the initial detected position further based on a difference between the second sensed position and the third sensed position.

14. The method of claim 13, further comprising, if the difference between the second sensed position and the third sensed position is approximately equal to the expected angular distance between the adjacent axes of the stator, setting a difference between the second sensed position and the expected angular distance as the initial detected position.

15. The method of claim 13, further comprising again rotating the rotor to the first position, determining a fourth sensed position, and calculating the initial detected position further based on a difference between the third sensed position and the fourth sensed position.

16. The method of claim 15, further comprising, if the difference between the second sensed position and the third sensed position is approximately equal to the expected angular distance between the adjacent axes of the stator, setting a difference between the second sensed position and the expected angular distance as the initial detected position.

* * * * *